US006496701B1

United States Patent
Chen et al.

(10) Patent No.: US 6,496,701 B1
(45) Date of Patent: Dec. 17, 2002

(54) PATTERN-RECOGNITION-BASED GEOLOCATION

(75) Inventors: Byron H. Chen, Whippany, NJ (US); Tung C. Chiang, Berkeley Heights, NJ (US); John Freidenfelds, Madison, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/139,107

(22) Filed: Aug. 25, 1998

(51) Int. Cl.[7] .............................................. H04Q 7/20
(52) U.S. Cl. ..................................................... 455/456
(58) Field of Search ................... 455/456, 457, 455/504, 505, 506, 67.6, 10; 342/378, 457, 417

(56) References Cited

U.S. PATENT DOCUMENTS

| | | | | |
|---|---|---|---|---|
| 5,394,158 A | * | 2/1995 | Chia | 342/457 |
| 5,602,903 A | * | 2/1997 | LeBlanc et al. | 455/456 |
| 5,844,522 A | * | 12/1998 | Sheffer et al. | 342/457 |
| 5,950,124 A | * | 9/1999 | Trompower et al. | 455/422 |
| 6,026,304 A | * | 2/2000 | Hilsenrath et al. | 455/456 |
| 6,064,339 A | * | 5/2000 | Wax et al. | 342/417 |
| 6,084,546 A | * | 7/2000 | Wax et al. | 342/378 |
| 6,104,344 A | * | 8/2000 | Wax et al. | 342/378 |
| 6,108,557 A | * | 8/2000 | Wax et al. | 455/456 |

FOREIGN PATENT DOCUMENTS

| | | |
|---|---|---|
| EP | 0631453 A2 | 12/1994 |
| EP | 0689369 A1 | 12/1995 |
| WO | WO 9202105 | 2/1992 |

OTHER PUBLICATIONS

Newton, Harry; Newton's Telecom Dictionary, 10th Addition, Feb. 1996, pp. 524–525.*
Japanese Abstract, Publication No. JP402044929A, Suzuki et al, Feb. 1990.*

* cited by examiner

Primary Examiner—Tracy Legree
(74) Attorney, Agent, or Firm—Harness, Dickey & Pierce, P.L.C.

(57) ABSTRACT

A technique for identifying a geographical location of a mobile terminal which includes receiving a set of characteristics from the mobile terminal, comparing the set of characteristics from the mobile terminal with a set of attributes for each of the cells, and identifying one of the sub-cells whose attributes most closely match the characteristics from the mobile terminal as the sub-cell in which the mobile terminal located. The attributes may include discrete RF attributes, such as average pilot strength, chip offset, or pilot strength. The attributes may also include continuous features, such as signature waveforms.

46 Claims, 4 Drawing Sheets

FIG. 4

| SUBCELL | BS1 | p1 | BS2 | p2 | BS3 | p3 |
|---|---|---|---|---|---|---|
| C1 | 161/232/16 | 1 | 166/84/8/28 | 0.72 | 181/108/2/22.3 | 0.57 |
|  |  |  | 166/84/7/28 | 0.14 | 181/108/1/22.3 | 0.14 |
|  |  |  | 181/108/1/30 | 0.14 | 181/108/3/22.3 | 0.14 |
|  |  |  |  |  | 166/84/1/29 | 0.14 |
| C2 | 161/232/29.5 | 0.27 | 172/208/1/20 | 0.27 | 181/108/0/24 | 0.27 |
|  | 161/64/28 | 0.09 | 178/416/0/25 | 0.09 | 181/108/3/27 | 0.09 |
|  | 178/416/25 | 0.69 | 161/64/1/28 | 0.18 | 172/208/1/24.3 | 0.55 |
|  |  |  | 161/64/0/27 | 0.18 | 172/208/2/18.5 | 0.18 |
|  |  |  | 161/232/0/32 | 0.18 |  |  |
|  |  |  | 161/232/1/34 | 0.09 |  |  |
| C3 | 178/416/21.6 | 1 | 161/64/2/27.4 | 0.45 | 172/208/3/24 | 0.18 |
|  |  |  | 161/64/3/26 | 0.18 | 172/208/2/22.5 | 0.18 |
|  |  |  | 172/208/1/24 | 0.09 | 172/208/0/21 | 0.27 |
|  |  |  | 172/208/3/26 | 0.09 | 173/364/7/23 | 0.09 |
|  |  |  | 173/28/1/38 | 0.09 | 173/364/3/22 | 0.09 |
|  |  |  | 173/28/0/40 | 0.09 | 161/64/3/33 | 0.18 |
| C4 | 178/416/23.3 | 1 | 161/64/1/22 | 0.33 | 172/208/0/22.5 | 0.67 |
|  |  |  | 161/64/0/29 | 0.33 | 173/28/3/32 | 0.33 |
|  |  |  | 172/208/2/17 | 0.33 |  |  |
| C5 | 178/416/19.25 | 1 | 172/208/2/21 | 0.5 | 161/64/2/24.6 | 0.75 |
|  |  |  | 172/208/1/18 | 0.25 | 161/232/2/24 | 0.25 |
|  |  |  | 172/208/0/17 | 0.25 |  |  |
| C6 | 178/416/24.8 | 1 | 172/208/1/18 | 0.6 | 161/64/3/23.75 | 0.8 |
|  |  |  | 172/208/0/17 | 0.2 | 161/64/4/24 | 0.2 |
|  |  |  | 172/208/2/20 | 0.2 |  |  |

PATTERN-RECOGNITION-BASED GEOLOCATION

BACKGROUND OF THE INVENTION

1. Field of the Invention

The present invention relates to a technique for performing pattern recognition-based geolocation under various RF propagation conditions, and more particularly, to a technique for locating a mobile caller within a cellular service area under various RF propagation conditions.

2. Description of the Related Art

A cellular telephone system must be able to locate a mobile caller within a cellular service area under various RF propagation conditions.

Conventional methods are based on either a triangulation technique, which requires signals from or to three or more base stations, or an angle of arrival technique, which requires at least two base stations. In many areas, the number of base stations that the mobile unit can detect or can be detected by, is less than two. Furthermore, both the triangulation and angle of arrival techniques suffer from inaccuracies and signal fading which result from multi-path propagation.

SUMMARY OF THE INVENTION

The present invention solves these problems by providing a method, apparatus, article of manufacture, and propagated signal which utilize pattern recognition-based geolocation to locate a mobile caller within a cellular service area under various RF propagation conditions.

The present invention matches the observed RF characteristics associated with the signal transmitted by a mobile unit (or signal received and reported back to a base station by a mobile unit) to a known set of RF characteristics and other information of a particular location. The location of the mobile unit is determined or estimated when a closely match pattern is found. Pattern recognition technology is utilized to find the matched pattern. In one embodiment, the pattern recognition technique is a Bayes formula for optimal estimation. The main advantages of the present invention are eliminating the need for detecting more than one base station and eliminating inaccuracies caused by multi-path propagation.

BRIEF DESCRIPTION OF THE DRAWINGS

FIG. 4 illustrates the structure and fields which make up the pattern database in one embodiment.

DETAILED DESCRIPTION OF THE INVENTION

Figure 1:
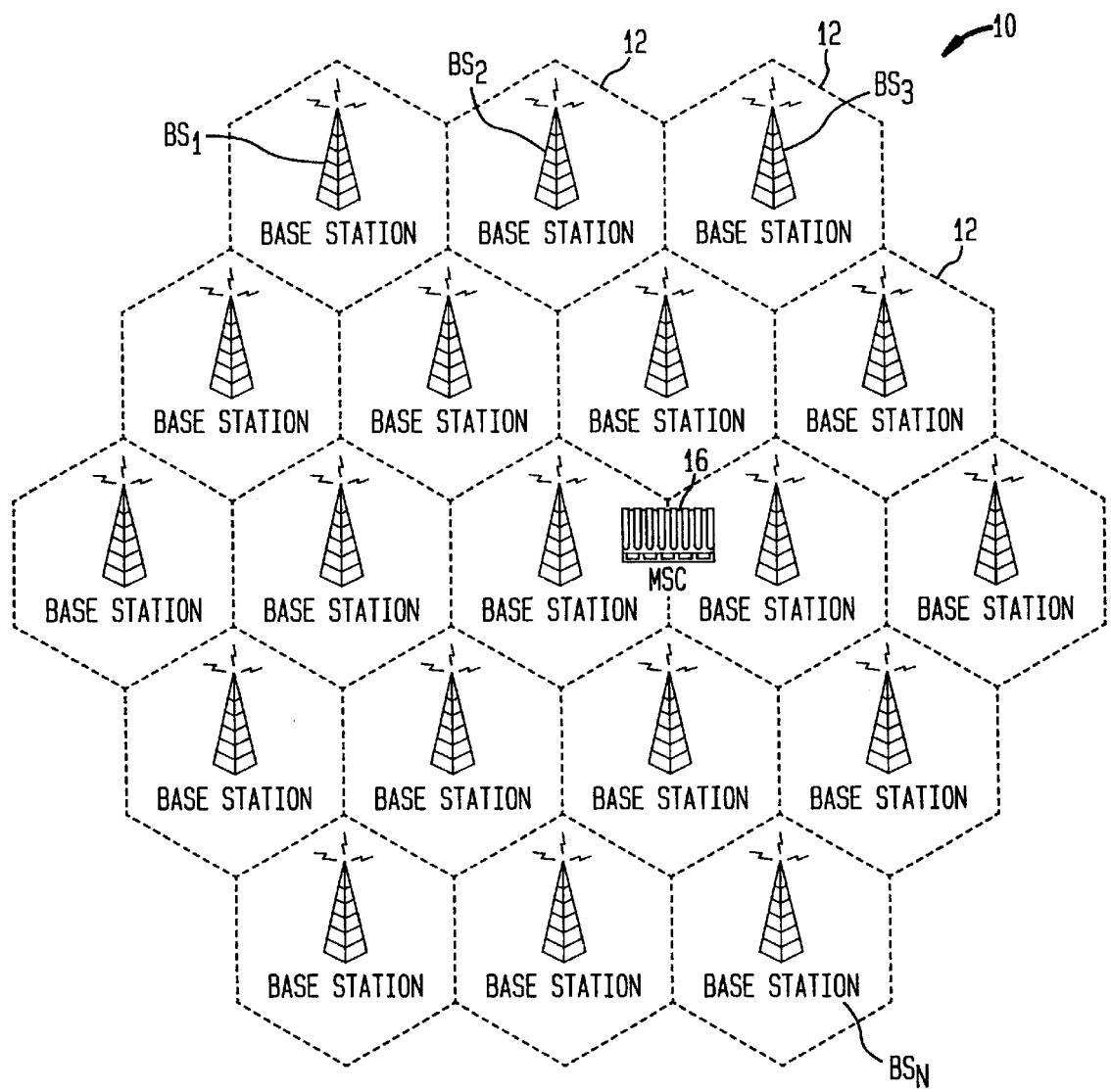
FIG. 1 illustrates a cellular service area divided into cells.
Figure 2:
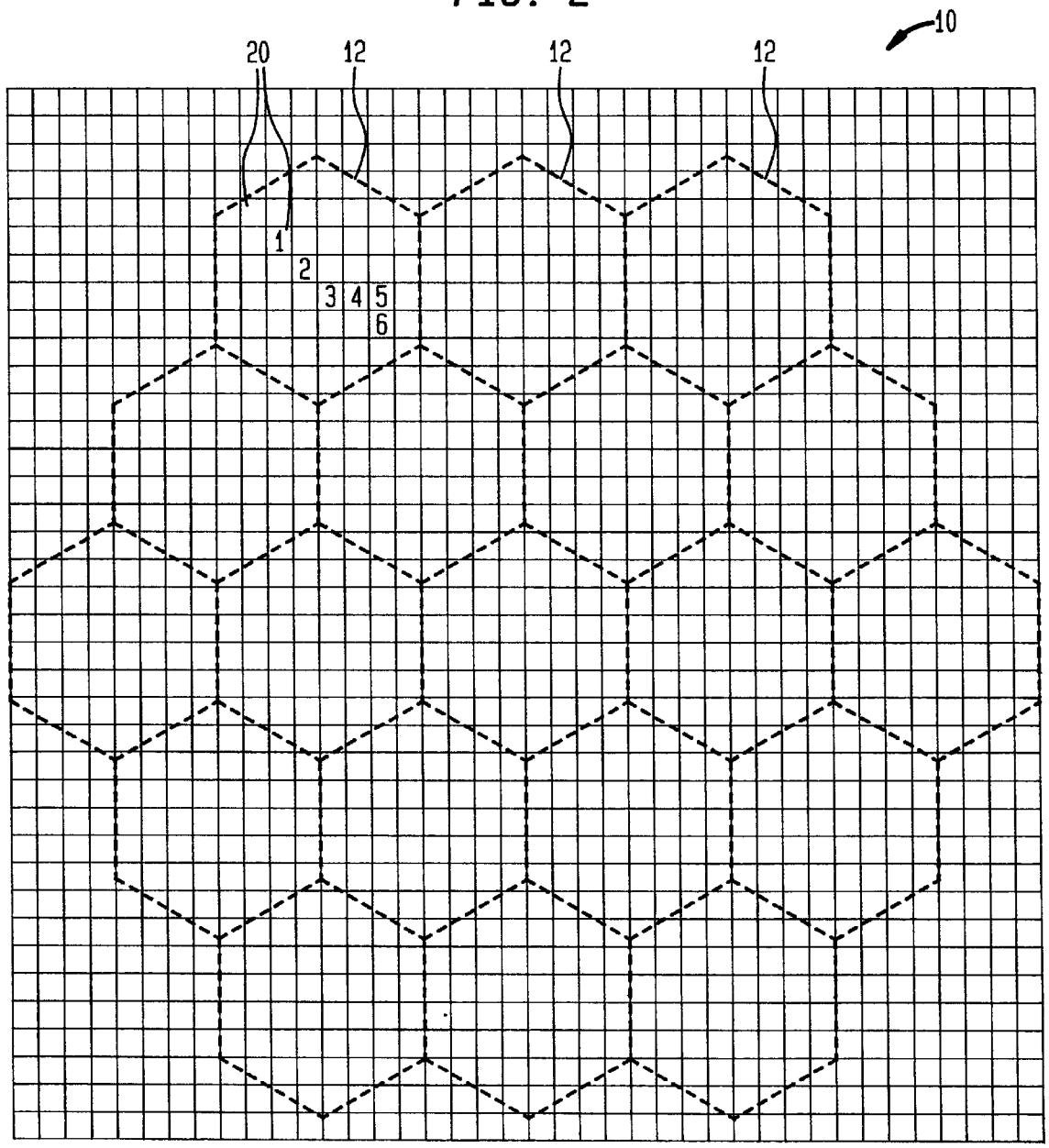
FIG. 2 illustrates the cells of FIG. 1 further divided into sub-cells.
Figure 3:
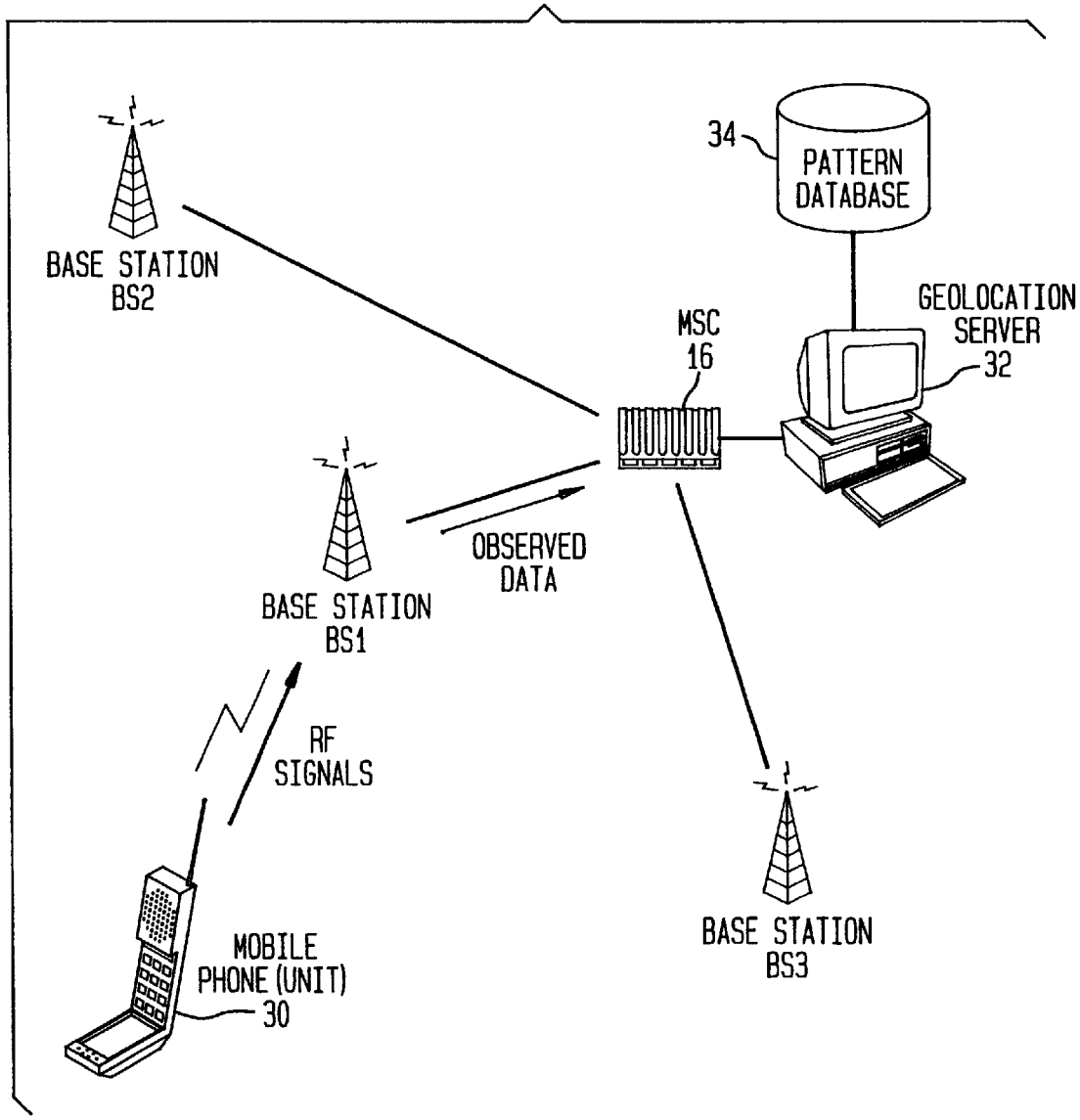
FIG. 3 illustrates one embodiment of the present invention.

FIG. 1 shows a cellular (or PCS) service area 10 including a plurality of cells 12. FIG. 1 also illustrates a plurality of base stations $BS_1 \ldots BS_N$ and at least one mobile switching center (MSC) 16. FIG. 2 shows the cells 12 of service area 10 divided into sub-cells 20 represented by the squares formed by the grid lines. The numbers shown represent the sub-cell $C_1$, $C_2$, $C_4$, $C_5$, and $C_6$ respectively. FIG. 3 shows the hardware architecture for determining the location of a mobile unit 30 in one embodiment.

In particular, FIG. 3 illustrates a mobile phone 30, three base stations $BS_1$, $BS_2$, $BS_3$, a mobile switching center 16, a geolocation server 32, and a data base 34.

As illustrated in FIGS. 1 and 2, the cellular service area 10 is partitioned into cells 12 and then sub-cells $C_1 \ldots C_M$. A set of detectable RF characteristics are defined for each sub-cell, which are referred to as the attributes/properties of the sub-cell. The mobile unit 30 measures the RF signals that are associated with the attributes/properties and reports the results to a primary base station $BS_1$ which in turn, reports to the geolocation server 32 illustrated in FIG. 3 via the MSC 16. The geolocation server 32 statistically compares the measured values with the known attribute values of all sub-cells in a predefined area. The sub-cell that has the best matched set of attribute values with the measured values is the one that the mobile unit 30 is reported to be in. The known set of attribute values in database 34 for each sub-cell account statistically for weather conditions, time of day, and other environmental variations that could affect the RF characteristics. As the mobile unit 30 moves, the comparison is periodically performed and the location of the mobile unit 30 can be determined at any given time. As a result, the problem of geolocation can be solved by pattern recognition.

In more detail, assume S is the area that the mobile unit 30 is known to be in. For example, S may be a sector that can be determined by the existing technology where the mobile unit 30 is. Further assume that $\{C_1, C_2, C_3 \ldots, C_m\}$ is a set of sub-cells which is a partition of S, such that $$S \cong \sum_{i=1}^{m} C_i$$

and $A=\{A_1, A_2, A_3, \ldots, A_n\}$ is the set of attributes of $C_i$ for I=1 to m. For example, $A_1$ is the PN code that identifies a particular base station $BS_x$, $A_2$ is the strength of the PN signal, and $A_3$ is the phase shift. $A_1 \ldots A_n$ are random variables. $D_i$ is the domain of $A_i$ which contains all possible values of $A_i$ and $a_j$ denotes a property which is defined such that the attribute $A_j$ has a certain value or a value set that can be used to characterize a sub-cell. For example, $a_j$ may represent $A_j=v$ or $A_j>v$ where v is a value in $D_j$. If $P(a_i)$ is the probability of the occurrence of $a_i$ over all sub-cells, $P(a_i|C_j)$ is the probability of the occurrence of $a_i$ in $C_j$, $P(C_j)$ the probability that the mobile unit 30 is in $C_j$ independent of properties, and $P(C_j|a_i)$ is the probability the mobile unit 30 is in $C_j$ given an observed property of $a_i$. The goal of the present invention is to find the highest $P(C_i|A^*)$, namely the highest probability that the mobile unit 30 is in $C_i$ given a set of measured or observed values $A^*$, where $A^*=\{a_1, a_2, a_3, \ldots, a_n\}$. In one embodiment, $P(C_i|A^*)$ can be obtained using the following Bayes formula:

$$P(C_i|A^*)=P(C_i)P(A^*|C_i)/P(A^*)$$

$P(C_i)$ can be assumed to be 1/m initially, a uniform distribution, since there is no a priori knowledge where the mobile unit 30 might be. $P(A^*)$ can be obtained using:

$$P(A^*)=\Sigma P(C_s)P(A^*|C_s), S=1, \ldots, m \text{ and}$$

$P(A^*|C_i)$ can be obtained using:

$$P(A^*|C_i)=P(a_1|C_i)P(a_2|C_i)P(a_3|C_i) \ldots P(a_n|C_i).$$

As the mobile unit 30 moves, the measurement is taken at time t+Δt, and $P(C_i)$ is updated with $P(C_i|A^*_t)$ where $A^*_t$ is the set of properties observed at t+Δt.

The database 34 for the sub-cells is defined by a set of attributes. The database 34 can be implemented as an adjunct server at the MSC 16 or any base station $BS_1 \ldots BS_N$ running any commercially available database management system. The database 34 is organized by cells and by sectors to provide efficient searching methods. The attribute values may be obtained by a survey of the coverage area and the probability distribution function for A* can be constructed based on the survey results.

Given the size of a regular cell is 2 km to 25 km in radius, the size of a sub-cell with 125 m radius will result in a reasonable size for the database. For example, if the cell has a radius of 25 km, the number of sub-cells will be approximately 40,000 in a cell. Hence, there will be 40,000 records per base station which is a relatively small database.

There are at least two methods that can be used to create the database 34.

One way is to use specially designed equipment to survey the service area 10 exhaustively. The equipment is used to gather RF characteristics for a location and record the data. The data records are then processed to create the database 34. This process is automated using a computer program to gather data and create the database 34. This method provides an accurate database.

The database 34 can also be created by the construction of a statistical model. The statistical model is constructed by using an RF propagation formula. The parameters in the model are verified by a limited number of observations of the RF characteristics in sample locations in the service area 10. The probability of certain observations can then be calculated and stored in the database 34.

FIG. 4 shows an example of the database 34 that contains the statistical data for $C_1$, $C_2$, $C_3$, $C_4$, $C_5$, and $C_6$ as in the first column. The second column represents the attribute $BS_1$ and its values, and the third column is the probability denoted by p1 of a particular attribute value could be observed in a sub-cell. For example, $BS_1=161/232/16$ has a probability of 1 in sub-cell $C_1$. In other words, let $a_1$ be $BS_1=161/232/16$, then $P(a_1/C_1)$ has the value 1. The numbers 161/232/16, for example, separate by "/" represent the base station ID, the pilot ID, and the average pilot strength for the base station and pilot, respectively. Similarly, the fourth column and fifth column represent the attribute values for $BS_2$ and their probabilities denoted by p2, and so on for $BS_3$ and p3. The four numbers separated by "/" in the latter cases represent the base station ID, the pilot ID, the chip offset, and the pilot strength, respectively.

Example

If an observation of interest is $A^*=(BS_1=178/416/24, BS_2=161/64/3/33, BS_3=172/208/3/25)$, the probability that this observation is from a particular cell can be calculated as follows:

$$P(A^*/C_1)=0*0*0=0$$

$$P(A^*/C_1)=0*0*0=0$$

$$P(A^*/C_1)=(21.6/24*1)*(26/33*0.18)*(24/25*0.18)=0.022$$

$$P(A^*/C_1)=(23.3/24*1)*(0)*(0)=0$$

$$P(A^*/C_1)=(19.25/24*1)*(0)*(0)=0$$

$$P(A^*/C_1)=(24.8/24*1)*(0)*(0)=0$$

Note that $P(A^*C_i) \geq P(A^*/C_j)$ for $i \neq j \rightarrow P(C_i/A^*) \geq P(C_j/A^*)$. Therefore, it is concluded that A* is an observation from $C_3$. Note also that the probability of $P(a2/C_3)$ is adjusted by a value 0.79 which is derived from 26/33, since a2 does not match exactly the pattern of $BS_2$ in $C_3$. In one embodiment, the present invention uses the ratio of the pilot strength stored in the database 34 to the observed pilot strength to define the measure of the closeness between the two values.

In the above embodiment, the RF attributes are discrete attributes, such as average pilot strength, chip offset, or pilot strength. However, in another embodiment, continuous attributes or features may be utilized, such as signature waveforms.

The set of attributes may be either replaced or enhanced by the signatures of the measured signal waveforms. Other pattern recognition techniques such as fuzzy logic can then be applied to analyze the continuous attributes.

Utilizing the pattern recognition-based technique or fuzzy logic technique described above may be performed utilizing only one base station or more than one base station.

The foregoing merely illustrates the principles of the invention. It will thus be appreciated that those skilled in the art will be able to devise various arrangements which, although not explicitly described or shown herein, embody the principles of the invention and are thus within its spirit and scope.

What is claimed is:

1. A method of identifying a geographical location of a mobile terminal, comprising the steps of:

comparing a set of discrete RF characteristics from the mobile terminal with a set of discrete RF attributes for each of a plurality of sub-cells; and identifying a sub-cell of the plurality of sub-cells whose set of discrete RF attributes most closely match the set of discrete RF characteristics from the mobile terminal as the sub-cell in which the mobile terminal is located.

2. The method of claim 1, wherein the set of discrete RF attributes for each of the plurality of sub-cells is stored at a mobile system base station or at a mobile switching center.

3. The method of claim 2, wherein only one mobile system base station is required to identify the location of the mobile terminal.

4. The method of claim 1, wherein the comparing and identifying steps are performed using pattern recognition.

5. The method of claim 1, wherein the set of discrete RF attributes for each of the plurality of sub-cells vary based on weather conditions, time of day, and environmental factors.

6. The method of claim 1, wherein said comparing and identifying steps are repeated over time as the mobile terminal moves.

7. The method of claim 1, said comparing step further comparing the set of discrete RF characteristics from the mobile terminal with the set of discrete RF attributes for each of the plurality of sub-cells and a waveform from the mobile terminal with at least one signature waveform for each of the plurality of sub-cells;

said identifying step identifying the sub-cell of the plurality of sub-cells whose set of discrete RF attributes and at least one signature waveform most closely match the set of discrete RF characteristics and the waveform from the mobile terminal as the sub-cell in which the mobile terminal is located.

8. The method of claim 1, wherein the set of discrete RF characteristics from the mobile terminal include pilot information.

9. The method of claim 8, wherein the pilot information includes at least one of pilot strength information, pilot strength ratio information, observed pilot strength information, average pilot strength information, and chip offset.

10. The method of claim 1, said identifying step utilizing conditional probability to identify the sub-cell of the plurality of sub-cells whose set of RF attributes most closely match the set of RF characteristics from the mobile terminal.

11. The method of claim 10, wherein the conditional probability includes Bayes Theorem.

12. A processor for identifying a geographical location of a mobile terminal, comprising:
a comparing unit for comparing a set of RF discrete characteristics from the mobile terminal with a set of discrete RF attributes for each of a plurality of sub-cells; and
an identifying unit for identifying a sub-cell of the plurality of sub-cells whose set of discrete RF attributes most closely match the set of discrete RF characteristics from the mobile terminal as the sub-cell in which the mobile terminal is located.

13. The processor of claim 12, wherein the set of discrete RF attributes for each of the plurality of sub-cells is stored at a mobile system base station or at a mobile switching center.

14. The processor of claim 13, wherein only one mobile system base station is required to identify the location of the mobile terminal.

15. The processor of claim 12, wherein the comparing and identifying units utilize pattern recognition.

16. The processor of claim 12, wherein the set of discrete RF attributes for each of the plurality of sub-cells vary based on weather conditions, time of day, and environmental factors.

17. The processor of claim 12, wherein said comparing and identifying units repeatedly operate over time as the mobile terminal moves.

18. The processor of claim 12,
said comparing unit further comparing the set of discretion RF characteristics from the mobile terminal with the set of discrete RF attributes for each of the plurality of sub-cells and a waveform from the mobile terminal with at least one. signature waveform for each of the plurality of sub-cells;
said identifying unit identifying the sub-cell of the plurality of sub-cells whose set of discrete RF attributes and at least one signature waveform most closely match the set of discrete RF characteristics and the waveform from the mobile terminal as the sub-cell in which the mobile terminal is located.

19. The processor of claim 12, wherein the set of discrete RF characteristics from the mobile terminal include pilot information.

20. The method of claim 19, wherein the pilot information includes at least one of pilot strength information, pilot strength ratio information, observed pilot strength information, average pilot strength information, and chip offset.

21. The processor of claim 12, said identifying unit utilizing conditional probability to identify the sub-cell of the plurality of sub-cells whose set of RF attributes most closely match the set of RF characteristics from the mobile terminal.

22. The processor of claim 21, wherein the conditional probability includes Bayes Theorem.

23. A computer program embodied in a computer-readable medium for identifying a geographical location of a mobile terminal, comprising:
a comparing source code segment for comparing a set of discrete RF characteristics from the mobile terminal with a set of discrete RF attributes for each of a plurality of sub-cells; and
an identifying source code segment for identifying a sub-cell of the plurality of sub-cells whose set of discrete RF attributes most closely match the set of discrete RF characteristics from the mobile terminal as the sub-cell in which the mobile terminal is located.

24. The computer program of claim 23, wherein the set of discrete RF attributes for each of the plurality of sub-cells is stored at a mobile system base station or at a mobile switching center.

25. The computer program of claim 24, wherein only one mobile system base station is required to identify the location of the mobile terminal.

26. The computer program of claim 23, wherein the comparing and identifying source code segments utilize pattern recognition.

27. The computer program of claim 23, wherein the set of discrete RF attributes for each of the plurality of sub-cells vary based on weather conditions, time of day, and environmental factors.

28. The computer program of claim 23, wherein said comparing and identifying source code segments are executed repeatedly over time as the mobile terminal moves.

29. The computer program of claim 23,
said comparing source code segment further comparing the set of discrete RF characteristics from the mobile terminal with the set of discrete RF attributes for each of the plurality of sub-cells and a waveform from the mobile terminal with at least one signature waveform for each of the plurality of sub-cells;
said identifying source code segment identifying the sub-cell of the plurality of sub-cells whose set of discrete RF attributes and at least one signature waveform most closely match the set of discrete RF characteristics and the waveform from the mobile terminal as the sub-cell in which the mobile terminal is located.

30. The computer program of claim 23, wherein the set of discrete RF characteristics from the mobile terminal include pilot information.

31. The computer program of claim 30, wherein the pilot information includes at least one of pilot strength information, pilot strength ratio information, observed pilot strength information, average pilot strength information, and chip offset.

32. The computer program of claim 23, said identifying source code segment utilizing conditional probability to identify the sub-cell of the plurality of sub-cells whose set of RF attributes most closely match the set of RF characteristics from the mobile terminal.

33. The computer program of claim 32, wherein the conditional probability includes Bayes Theorem.

34. A computer data signal for identifying a geographical location of a mobile terminal, comprising:
a comparing signal segment for comparing a set of discrete RF characteristics from the mobile terminal with a set of discrete RF attributes for each of a plurality of sub-cells; and an identifying signal segment for identifying a sub-cell of the plurality of sub-cells whose set of discrete RF attributes most closely match the set of discrete RF characteristics from the mobile terminal as the sub-cell in which the mobile terminal is located.

35. The computer data signal of claim 34, wherein the set of discrete RF attributes for each of the plurality of sub-cells is stored at a mobile system base station or at a mobile switching center.

36. The computer data signal of claim 35, wherein only one mobile system base station is required to identify the location of the mobile terminal.

37. The computer data signal of claim 34, wherein the comparing and identifying signal segments utilize pattern recognition.

38. The computer data signal of claim 34, wherein the set of discrete RF attributes for each of the plurality of sub-cells vary based on weather conditions, time of day, and environmental factors.

39. The computer data signal of claim 34, wherein said comparing and identifying signal segments are repeated over time as the mobile terminal moves.

40. The computer data signal of claim 34,
said comparing signal segment further comparing the set of discrete RF characteristics from the mobile terminal with the set of discrete RF attributes for each of the plurality of sub-cells and a waveform from the mobile terminal with at least one signature waveform for each of the plurality of sub-cells; said identifying signal segment identifying the sub-cell of the plurality of sub-cells whose set of discrete RF attributes and at least one signature waveform most closely match the set of discrete RF characteristics and the waveform from the mobile terminal as the sub-cell in which the mobile terminal is located.

41. The computer data signal of claim 34, wherein the computer data signal is embodied in a carrier wave.

42. The computer data signal of claim 34, wherein the set of discrete RF characteristics from the mobile terminal include pilot information.

43. The computer data signal of claim 42, wherein the pilot information includes at least one of pilot strength information, pilot strength ratio information, observed pilot strength information, average pilot strength information, and chip offset.

44. The computer data signal of claim 34, said identifying signal segment utilizes conditional probability to identify the sub-cell of the plurality of sub-cells whose set of RF attributes most closely match the set of RF characteristics from the mobile terminal.

45. The computer data signal of claim 44, wherein the conditional probability includes Bayes Theorem.

46. A computer data signal for identifying a geographical location of a mobile terminal, comprising:

a comparing signal segment for comparing a waveform from the mobile terminal with at least one signature waveform for each of a plurality of sub-cells; and an identifying signal segment for identifying a sub-cell of the plurality of sub-cells whose at least one waveform most closely matches the waveform from the mobile terminal as the sub-cell in which the mobile terminal is located, wherein the comparing and identifying signal segments utilize fuzzy logic and the computer data signal is embodied in a carrier wave.

* * * * *